(12) United States Patent
Takahashi et al.

(10) Patent No.: US 7,654,306 B2
(45) Date of Patent: Feb. 2, 2010

(54) HEAT-STORAGE UNIT AND OPERATION METHOD OF HEAT-STORAGE UNIT

(75) Inventors: Kazuo Takahashi, Kobe (JP); Hiromiki Yagi, Kobe (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 215 days.

(21) Appl. No.: 11/489,571

(22) Filed: Jul. 20, 2006

(65) Prior Publication Data

US 2007/0029065 A1 Feb. 8, 2007

(30) Foreign Application Priority Data

Aug. 5, 2005 (JP) ............................. 2005-227752

(51) Int. Cl.
*F28D 19/00* (2006.01)
*F28D 17/00* (2006.01)

(52) U.S. Cl. ..................................... 165/10; 165/104.17

(58) Field of Classification Search .................. 165/10, 165/104.11, 104.14, 104.17, DIG. 162; 62/123, 62/430

See application file for complete search history.

(56) References Cited

U.S. PATENT DOCUMENTS

| | | | | |
|---|---|---|---|---|
| 3,227,649 A | * | 1/1966 | Ghormley et. al. | 165/111 |
| 4,086,958 A | * | 5/1978 | Lindner et al. | 165/10 |
| 4,219,072 A | * | 8/1980 | Barlow, Sr. | 165/276 |
| 4,300,622 A | * | 11/1981 | Lindner | 165/104.17 |
| 4,371,029 A | * | 2/1983 | Lindner et al. | 165/10 |
| 4,466,478 A | * | 8/1984 | Carlsson et al. | 165/104.17 |
| 2007/0079951 A1 | * | 4/2007 | Takahashi et al. | 165/10 |

FOREIGN PATENT DOCUMENTS

| | | |
|---|---|---|
| DE | 44 43 320 A1 | 12/1994 |
| DE | 195 33 646 A1 | 9/1995 |
| DE | 196 18 779 A1 | 5/1996 |

(Continued)

*Primary Examiner*—Tho V Duong
(74) *Attorney, Agent, or Firm*—Stites & Harbison PLLC; Juan Carlos A. Marquez, Esq.

(57) ABSTRACT

Provided is a heat-storage unit capable of efficiently storing heat in a heat-storage material and sufficiently taking out the stored heat.

The heat-storage unit capable of exchanging heat by direct contact between sodium acetate and oil, storing heat in the sodium acetate, and radiating heat from the sodium acetate by supplying the oil, which has a smaller specific gravity than the sodium acetate and is separated from the sodium acetate, into a heat-storage tank housing the sodium acetate, which stores heat depending on a state change between solid and liquid, in an internal space, in which the unit includes: a third flow pipe of a supply pipe, at least a part of which is provided in a lower portion of the internal space and in which the oil flows; a plurality of discharge holes which are provided for the third flow pipe and discharge the oil flowing through the third flow pipe into the sodium acetate; a fourth flow pipe of the supply pipe, which is connected to the third flow pipe and discharges the oil flowing through the third flow pipe to the outside of the sodium acetate; and a valve that shuts off the fourth flow pipe corresponding to the state change of the sodium acetate.

4 Claims, 5 Drawing Sheets

| FOREIGN PATENT DOCUMENTS | | | | | |
|---|---|---|---|---|---|
| EP | 1 693 636 A1 | 12/2004 | WO | WO 95/16176 | 6/1995 |
| EP | 1 715 258 A2 | 3/2006 | WO | WO 03/019099 | 3/2003 |
| GB | 2049922 A * | 12/1980 | | | |

* cited by examiner

HEAT-STORAGE UNIT AND OPERATION METHOD OF HEAT-STORAGE UNIT

BACKGROUND OF THE INVENTION

1. Field of the Invention

The present invention relates to a heat-storage unit capable of storing heat such as waste heat and transporting heat to a remote place, and an operation method of the heat-storage unit.

2. Description of the Prior Art

Heat generated from a factory such as ironworks and garbage-disposal facility, for example, is used in various facilities near the factory. Further, by temporarily storing the heat generated from the factory in a heat-storage material or the like and transporting the heat-storage material, the heat can be used in a place remote from the factory. As an apparatus for storing heat, there exists an apparatus that performs heat exchange by directly contacting a medium such as oil, to which heat was supplied, with metal hydrate and stores heat into the metal hydrate.

For example, the storage container of International Publication No. WO 03/019099 houses a heat-storage material such as sodium acetate that stores heat and oil having a smaller specific gravity than that of the heat-storage material. Since the specific gravity of oil is smaller and oil and heat-storage material do not mix with each other, they are housed in a vertically separated manner. Then, pipes are disposed in the oil and the heat-storage material and are severally connected to a heat exchanger. Oil is taken into the heat exchanger from one pipe, heat is supplied to the oil, and the oil to which heat was supplied is discharged from the other pipe. Since the discharged oil has small specific gravity, it goes up to oil in the upper portion. Heat is exchanged by the direct contact between the heat-storage material and the oil as the oil goes up. By repeating the above-described action, heat is stored in the heat-storage material. Then, the pipes of International Publication No. WO 03/019099 are in a double pipe structure in order to prevent impurities from entering the pipes and the heat exchanger.

Further, in the storage container of International Publication No. WO 03/019099, when taking out the heat stored in the heat-storage material, oil to which heat is not supplied is discharged from the pipe arranged in the heat-storage material. Then, while the oil goes up to the oil in the upper portion, the stored heat is supplied to the ascending oil by the direct contact between the heat-storage body and the oil. By taking out heat in the heat exchanger from the oil to which heat was supplied, the stored heat can be used. By repeating the above-described action, the heat stored in the heat-storage material can be taken out (heat radiation of heat-storage material).

A heat-storage material such as sodium acetate that stores heat utilizes latent heat of fusion, its state changes from solid to liquid as heat is added and heat is stored in the heat-storage material, and the state changes from liquid to solid as heat is taken out to radiate heat from the heat-storage material. For this reason, because the heat-storage material at the starting point of heat storage is solid in International Publication No. WO 03/019099, discharge holes are clogged by the solid heat-storage material even when the storage container tries to discharge the oil, to which heat was supplied, from the pipe arranged in the heat-storage material, the oil cannot be discharged until heat is added to the heat-storage material and the material changes to liquid, and there are cases where the pipe bursts.

To solve the problem, a constitution is considered where another pipe is provided for letting out the oil in the pipe arranged in the heat-storage material until the heat-storage material melts and the oil can be discharged from the discharge holes. However, in taking out the stored heat in this constitution, the flow path resistance of the discharge holes becomes larger as the state of the heat-storage material reversely changes from liquid to solid, so that the oil in the pipe is not discharged from the discharge holes into the heat-storage material but flows to the pipe, which was provided separately, as heat is radiated from the heat-storage material. Consequently, it becomes impossible to directly contact the heat-storage material with the oil, and heat cannot be sufficiently taken out from the heat-storage material.

SUMMARY OF THE INVENTION

Consequently, it is an object of the present invention to provide a heat-storage unit capable of efficiently storing heat in a heat-storage material and sufficiently taking out the stored heat, and an operation method of the heat-storage unit.

From the viewpoint of the above-described object, the first aspect of the invention is a heat-storage unit capable of exchanging heat by direct contact between a heat exchange medium and a heat-storage material, storing heat in the heat-storage material, and radiating heat from the heat-storage material by supplying the heat exchange medium, which has a smaller specific gravity than the heat-storage material and is separated from the heat-storage material, into a heat-storage tank housing the heat-storage material, which stores heat depending on a state change between solid and liquid, in an internal space, in which the unit includes: a first flow pipe at least a part of which is provided in a lower portion of the internal space and through which the heat exchange medium flows; a plurality of discharge holes which are provided for the first flow pipe and discharge the heat exchange medium flowing through the first flow pipe into the heat-storage material; the second flow pipe that is connected to the first flow pipe and discharges the heat exchange medium flowing through the first flow pipe to the outside of the heat-storage material; and a shutoff section that shuts off the second flow pipe corresponding to the state change of the heat-storage material.

According to this constitution, the second flow pipe is shut off corresponding to the state change of the heat-storage material, so that it is possible to appropriately change whether the heat exchange medium flowing through the first flow pipe should be forcibly discharged from the discharge holes into the heat-storage material housed in the heat-storage tank or should be discharged from the second flow pipe into the heat exchange medium housed in the heat-storage tank. Thus, heat can be efficiently stored in the heat-storage material and heat can be efficiently radiated from the heat-storage material. Note that the heat radiation means to take out heat that was stored in the heat-storage material.

Specifically, when the discharge holes are clogged by the heat-storage material, the heat exchange medium in the first flow pipe flows through the second flow pipe having a smaller flow path resistance, and is discharged outside the heat-storage material. Therefore, the heat exchange medium is discharged from the second flow pipe to the outside of the heat-storage material without directly contacting the heat-storage material, and heat exchange between the heat exchange medium and the heat-storage material is not performed sufficiently. Then, by shutting off the second flow pipe corresponding to the state of the heat-storage material, the heat exchange medium in the first flow pipe is forcibly discharged from the discharge holes into the heat-storage material, and sufficient heat exchange is performed by the direct contact with the heat-storage material. Therefore, it is possible to efficiently radiate heat or store heat from/in the heat-storage material.

Further, the second aspect of the invention is a heat-storage unit capable of exchanging heat by direct contact between a heat exchange medium and a heat-storage material, storing heat in the heat-storage material, and radiating heat from the heat-storage material by supplying the heat exchange medium, which has a smaller specific gravity than the heat-storage material and is separated from the heat-storage material, into a heat-storage tank housing the heat-storage material, which stores heat depending on a state change between solid and liquid, in an internal space, in which the unit includes: a separating plate that vertically separates the internal space in order to house the heat-storage material on the upper side and the heat exchange medium on the lower side and has passage holes where the heat exchange medium can pass through; a first flow pipe that supplies the heat exchange medium to the lower side of the separating plate; a second flow pipe that is connected to the first flow pipe, arranged so as to pass at least through the heat-storage material, and discharges the heat exchange medium flowing through the inside thereof to the outside of the heat-storage material; and a shutoff section that shuts off the second flow pipe corresponding to the state change of the heat-storage material.

According to this constitution, the second flow pipe is shut off corresponding to the state change of the heat-storage material, so that it is possible to appropriately change whether the heat exchange medium flowing through the first flow pipe should be forcibly discharged from the discharge holes into the heat-storage material housed in the heat-storage tank or should be discharged from the second flow pipe into the heat exchange medium housed in the heat-storage tank. Thus, heat can be efficiently stored in the heat-storage material and heat can be efficiently radiated from the heat-storage material. Note that the heat radiation means to take out heat that was stored in the heat-storage material.

The third aspect of the invention is characterized in that the second flow pipe of the second aspect of the invention is arranged so as to further pass under the separating plate.

According to this constitution, by allowing the second flow pipe to pass under the separating plate, heat exchange is indirectly performed between the heat exchange medium flowing through the second flow pipe and the heat exchange medium housed in the lower side of the separating plate. Therefore, in the case where the heat exchange medium flowing through the second flow pipe carries heat, the heat exchange medium under the separating plate can be maintained at high temperature. Then, by discharging the heat exchange medium under the high-temperature separating plate from the passage holes into the heat-storage material, heat can be efficiently stored in the heat-storage material.

The fourth aspect of the invention is an operation method of the heat-storage unit of the first to third aspects of the invention, in which the heat exchange medium is allowed to flow through the second flow pipe when storing heat in the heat-storage material, and the shutoff section is operated to shut off the heat exchange medium flowing through the second flow pipe when radiating heat from the heat-storage material.

According to this constitution, since a flow destination of the heat exchange medium when storing heat and radiating heat is changed, the problem that the heat exchange medium does not flow depending on the state of the heat-storage material can be solved. This makes it possible to sufficiently flow the heat exchange medium, and heat storage or heat radiation in/from the heat-storage material can be performed efficiently.

Specifically, the heat-storage material at the starting point of heat storage is solid, and the discharge holes are clogged by the heat-storage material. Therefore, by allowing the heat exchange medium to flow through the second flow pipe, the heat exchange medium in the first flow pipe is discharged outside the heat-storage material. This eliminates the danger that the heat exchange medium in the first flow pipe has nowhere to go and the first flow pipe bursts, or the like. Then, by allowing the heat exchange medium to flow, the heat of the heat exchange medium can be conducted to the heat-storage material by the indirect contact via the flow pipe, and when the heat-storage material melts by the heat conduction, the heat exchange medium is discharged from the discharge holes into the heat-storage material and it becomes possible to allow the heat exchange medium and the heat-storage material to contact directly. Thus, heat can be efficiently stored.

Further, when radiating heat from the heat-storage material, sufficient heat exchange is performed by directly contacting the heat exchange medium and the heat-storage material, and stored heat can be taken out. However, the state of, the heat-storage material is changed to solid as heat radiation continues. Eventually, the discharge holes are clogged by the heat-storage material, and the heat exchange medium in the first flow pipe is discharged outside the heat-storage material. Therefore, by shutting off the heat exchange medium flowing through the second flow pipe the heat exchange medium in the first flow pipe is forcibly discharged from the discharge holes into the heat-storage material, and this can allow the heat exchange medium to directly contact the heat-storage material. Accordingly, heat stored in the heat-storage material can be sufficiently taken out.

DESCRIPTION OF THE PREFERRED EMBODIMENTS

In the following, preferred embodiments of the present invention will be described with reference to the drawings.

First Embodiment

Figure 1:
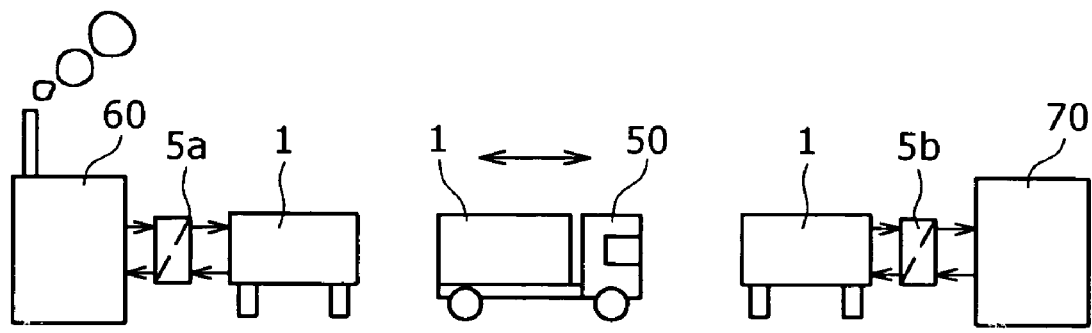
FIG. 1 is an entire outline view of a heat transportation system of the present invention.
Figure 2:
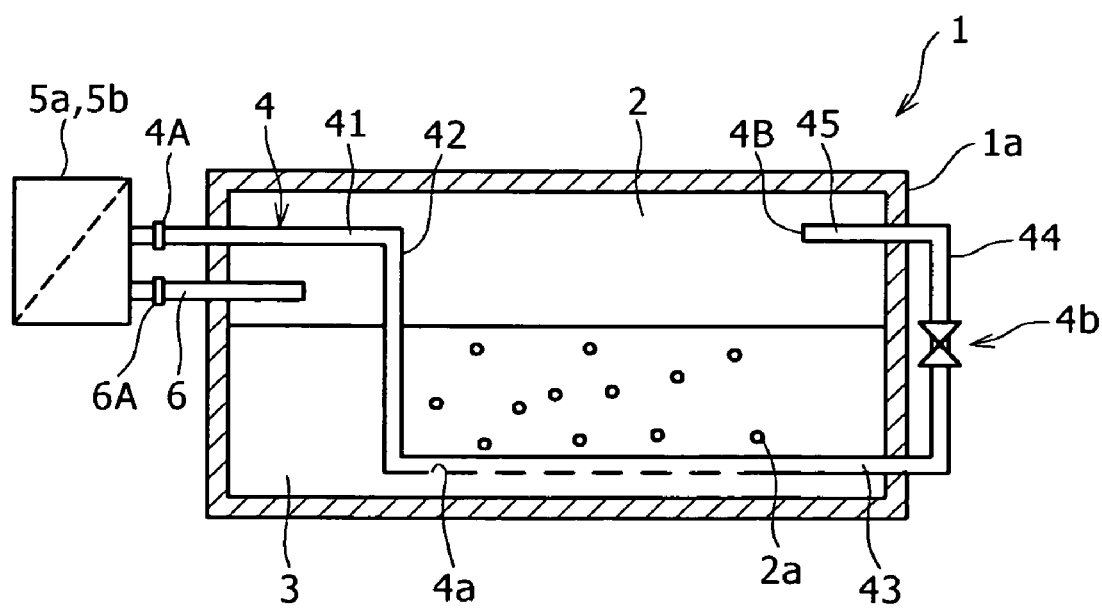
FIG. 2 is a sectional view of a heat-storage unit according to a first embodiment of the present invention.

A heat-storage unit 1 according to a first embodiment of the present invention is portable, and it is used for a heat transportation system that transports heat by a vehicle 50 such as a truck when a factory 60 generating waste heat and facility 70 using the waste heat are remote from each other as shown in FIG. 1, for example. Note that the factory 60 is garbage-incinerating facility, a power generating plant, an ironworks or the like, and the facility 70 is facility such as a heated swimming pool and a hospital.

The heat-storage unit 1 is detachable to heat exchanges 5a, 5b (described later) for performing heat storage and heat radiation to the heat-storage unit 1, and it includes a heat-storage tank 1a, a supply pipe 4 (first flow pipe, second flow pipe), and a discharge pipe 6. Herein, the heat storage means to store heat in the heat-storage tank 1a that is sodium acetate trihydrate salt 3 (described later) specifically, and the heat radiation means to take out the heat stored in sodium acetate trihydrate salt 3.

The heat-storage tank 1a has an internal space, a heat-insulation material or the like made of bubble foam resin having heat insulation property is attached around its peripheral area. Then, oil 2 (heat exchange medium) and the sodium acetate trihydrate salt 3 (heat-storage material) (hereinafter, referred to as sodium acetate 3) are housed in the internal space of the heat-storage tank 1a. Since the oil 2 and the sodium acetate 3 are not mixed with each other and the oil 2 has a smaller specific gravity than that of the sodium acetate 3, the oil 2 and the sodium acetate 3 are respectively housed in an upper layer and a lower layer of the heat-storage tank 1a in a separate manner. Furthermore, since the oil 2 and the sodium acetate 3 are not mixed, a member or the like for separating the oil 2 from the sodium acetate 3 is not laid between them and the oil 2 is in direct contact with the sodium acetate 3.

The oil 2 is a heat medium for storing heat, which was generated from the factory 60 and supplied from the heat exchanger 5a, in the sodium acetate 3 by performing heat exchange using direct or indirect contact with the sodium acetate 3 or taking out the heat stored in the sodium acetate 3 and supplying it to the heat exchanger 5b. The oil 2 is housed in the heat-storage tank 1a, and circulates in the supply pipe 4, the discharge pipe 6 and the heat exchangers 5a, 5b while performing heat exchange. Although described in detail later, the oil 2 in the upper layer of the heat-storage tank 1a is taken into the heat exchangers 5a, 5b from the discharge pipe 6. Then, the oil 2 taken into the heat exchangers 5a, 5b is supplied with heat from the heat exchanger 5a or supplies heat to the heat exchanger 5b. After that, the oil is returned from the supply pipe 4 into the heat-storage tank 1a again.

The sodium acetate 3 is a heat-storage medium that stores heat by the state change between solid and liquid. The sodium acetate 3 stores heat by directly or indirectly contacting the oil 2, to which heat was supplied, to allow the heat of the oil 2 to conduct. Further, when heat is fully stored, it conducts the stored heat to the oil 2 by directly or indirectly contacting the oil 2 having no heat, and radiates heat. The melting point of the sodium acetate 3 is about 58° C. and it is solid under the normal state (room temperature). Then, in storing heat, once the oil 2 to which heat was supplied is taken from the heat exchanger 5a into the heat-storage tank 1a, the sodium acetate 3 melts due to the heat of the oil 2, and its state changes from solid to liquid. Furthermore, in radiating heat, once the oil 2 to which heat is not supplied is taken into the heat-storage tank 1a, the heat stored in the sodium acetate 3 is taken away by the oil 2, and the state of the sodium acetate 3 changes from liquid to solid.

Note that the heat-storage material for storing heat may be a material other than sodium acetate, and it may be erythritol or the like, for example. In the case where the melting point of the erythritol 3 is 100° C. and higher, a heat-storage time becomes longer if the temperature of the oil 2 is low or a supply amount is small. However, the heat-storage time can be shortened because the oil 2 can be maintained at the most suitable temperature and supply amount.

The supply pipe 4 has a constitution that a first flow pipe 41, a second flow pipe 42, a third flow pipe 43, a fourth flow pipe 44 and a fifth flow pipe 45 are connected in order, through which the oil 2 can flow. The first flow pipe 41 is provided for the sidewall of the heat-storage tank 1a in a penetrated manner. At this point, the first flow pipe 41 is provided in a position where it is protruded into the oil 2 in the upper layer, which is housed in the heat storage tank 1a. A connection port 4A for detachably connecting to the heat exchangers 5a, 5b is provided for one end of the first flow pipe 41, and the upper end of the second flow pipe 42, which is orthogonally arranged, is disposed on the other end. The second flow pipe 42 is designed to vertically cross the boundary surface between the oil 2 and the sodium acetate 3 which are housed in the heat-storage tank 1a.

The third flow pipe 43 is disposed on the lower end of the second flow pipe 42 on the opposite side of the first flow pipe 41. The third flow pipe 43 horizontally passes the lower portion of the sodium acetate 3 and is vertically provided for the sidewall of the heat-storage tank 1a in a penetrated manner so as to protrude outside the heat-storage tank 1a. Then, outside the heat-storage tank 1a, the lower end of the fourth flow pipe 44 is vertically disposed on one end of the third flow pipe 43. Furthermore, one end of the fifth flow pipe 45, which is vertically provided for the sidewall of the heat-storage tank 1a in a penetrated manner, is disposed on the upper end of the fourth flow pipe 44 so as to protrude into the oil 2 that is housed in the heat-storage tank 1a. On the other end of the fifth flow pipe 45, a discharge port 4B that discharges the oil 2 flowing inside the pipe is provided.

The oil 2 from the heat exchangers 5a, 5b passes through the sodium acetate 3 that is housed in the heat-storage tank 1a via the supply pipe 4 constituted as described above, and is discharged from the discharge port 4B into the oil 2 in the upper layer.

A plurality of discharge holes 4a for discharging the oil 2 flowing inside the pipe is provided for the third flow pipe 43. The discharge holes 4a are provided so as to be open in an orthogonally downward direction of the third flow pipe 43 that is horizontally arranged. Thus, since the sodium acetate 3 has a larger specific gravity than that of the oil 2, the sodium acetate 3 does not enter the supply pipe 4 by pushing aside the oil 2a to be discharged from the discharge holes 4a, and this prevents the sodium acetate 3 from being solidified to clog the holes inside the supply pipe 4. Note that the discharge holes 4a may be provided for the second flow pipe 42 on a position below the boundary surface between the oil 2 and the sodium acetate 3.

Further, a valve 4b is provided for the fourth flow pipe 44. The valve 4b is a device that can be opened/closed for shutting off the oil 2 flowing inside the pipe, adjusting the flow amount, or the like. The flow path of the fourth flow pipe 44 can be opened by opening the valve 4b, the oil 2 from the heat exchangers 5a, 5b flows through the first flow pipe 41, the second flow pipe 42, the third flow pipe 43, the fourth flow pipe 44 and the fifth flow pipe 45, and is discharged from the discharge port 4B into the oil 2 in the upper layer. More specifically, since the discharge holes 4a of the third flow pipe 43 are clogged by the sodium acetate 3, the oil 2 flowing through the third flow pipe 43 flows through the flow pipes 44, 45 having smaller resistance and is discharged from the discharge port 4B. Furthermore, the flow path of the fourth flow pipe 44 is shut off by closing the valve 4b, the oil 2 from the heat exchangers 5a, 5b flows through the first flow pipe 41 and the second flow pipe 42, and is discharged from the discharge holes 4a of the third flow pipe 43 into the sodium acetate 3. The opening/closing of the valve 4b is adjusted corresponding to the state (liquid state, solid state) of the sodium acetate 3.

The discharge pipe 6 has a connection port 6A detachable to the heat exchangers 5a, 5b on its one end, and is vertically provided for the sidewall of the heat-storage tank 1a in a penetrated manner in order to supply the oil 2 from the heat-storage tank 1a to the heat exchangers 5a, 5b. At this point, the discharge pipe 6 is disposed in the heat-storage tank 1a to be positioned below the first flow pipe 41 of the supply pipe 4.

By arranging the discharge pipe 6 below the first flow pipe 41 of the supply pipe 4, there are cases where an accident caused in removing them from the heat exchanger 5a can be prevented. When heat is fully stored, the sodium acetate 3 housed in the heat-storage tank 1a is high temperature. So, if the supply pipe 4 and the discharge pipe 6 are removed from the heat exchanger 5a in a wrong procedure, there is a possibility that the oil 2 or the sodium acetate 3 flows reversely due to a pressure difference between the outside and the inside of the heat-storage tank 1a. For this reason, the discharge pipe 6 is arranged below the supply pipe 4 to allow the oil 2 to which heat is not supplied to flow reversely first from the discharge pipe 6. Consequently, a pressure difference from the outside is eliminated and there are cases where a danger that the sodium acetate 3, to which heat was stored and which is high temperature, enters from the discharge holes 4a of the supply pipe 4 to flow reversely is prevented.

The heat-storage unit 1 constituted as described above is capable of being connected detachably to the heat exchangers 5a, 5b. The heat exchangers 5a, 5b perform heat storage or heat radiation to the heat-storage unit 1. Specifically, the heat exchanger 5a is installed in the factory 60, stores heat generated from the factory 60 in the heat-storage tank 1a, and the heat exchanger 5b is installed in the facility 70, takes out the heat stored in the heat-storage tank 1a, and supplies the heat, which was taken out, to gas (or liquid) that uses heat in the facility 70.

The heat exchanger 5a has a pipe for oil, which communicates the supply pipe 4 and the discharge pipe 6 in the heat-storage tank 1a, which are connected in the heat exchanger 5. Furthermore, the heat exchanger 5a has a pipe for steam, to which a pipe (not shown) that takes in the heat generated from the factory 60 as steam and a pipe (not shown) that discharges the steam from which heat was taken out are connected, and which communicates the pipes in the heat exchanger 5a. The pipe for steam and the pipe for oil are provided so as to closely adhere to each other.

The heat exchanger 5a constituted as described above takes in the oil 2 in the heat-storage tank 1a via the discharge pipe 6 while takes in the steam generated from the factory 60. Then, the heat of the steam conducts to the oil 2 due to the indirect contact between the pipe for oil and the pipe for steam which are closely adhered to each other. After that, the oil 2a that took in the heat is supplied into the heat-storage tank 1a via the supply pipe 4. Further, the steam from which heat was taken out is discharged. When the heat exchanger 5a repeats the above-described action, the heat generated from the factory 60 can be supplied to the oil 2, and heat can be stored when the heat-storage tank 1a takes in the oil 2.

Furthermore, the heat exchanger 5b is in the same constitution as the heat exchanger 5a. Then, the heat exchanger 5b takes in the oil 2 in the heat-storage tank 1a via the discharge pipe 6 while it takes in gas (or liquid) that uses heat in the facility 70. The oil 2 at this point has taken in heat due to the contact with the sodium acetate 3 that fully stored heat. Then, the heat of the oil 2 conducts to the gas (or liquid) for using heat in the facility 70 due to the indirect contact with the pipe for oil and the pipe for steam, which are closely adhered to each other. After that, the oil 2a from which heat was taken out is supplied into the heat-storage tank 1a via the supply pipe 4, and the gas (or liquid) to which heat was supplied is supplied to the facility 70. When the heat exchanger 5b repeats the above-described action, the heat stored in the heat-storage unit 1 can be taken out to be used in the facility 70.

Note that the gas (or liquid) for using heat in the facility 70 is water if it is used for cooling the facility 70, for example. The heat of the oil 2 is supplied to water into hot water, the hot water is evaporated in the facility 70 to make cold water by using the heat of vaporization generating at this point, and cooling can be performed by using the cold water. In addition, the above-described hot water can be used for hot water swimming pool or the like, and the heat taken out is used for various types of equipment and devices.

Next, description will be made for the operation method of the heat-storage unit 1 and the action of oil 2 when performing heat storage and heat radiation to the heat-storage unit 1.

(In Heat Storage)

In the factory 60, the supply pipe 4 and the discharge pipe 6 of the heat-storage unit 1 are connected to the heat exchanger 5a. At this point, the valve 4b of the heat-storage unit 1 is opened to open the flow path to allow the oil 2 to flow through the fourth flow pipe 44 and the fifth flow pipe 45. Then, the steam generated from the factory 60 is taken into the heat exchanger 5a while the oil 2 in the heat-storage tank 1a is taken into the heat exchanger 5a via the discharge pipe 6. In the heat exchanger 5a, the heat of the steam conducts to the oil 2 due to the indirect contact via the pipe. Then, the oil 2 that took in the heat is returned from the supply pipe 4 to the heat-storage tank 1a.

The oil 2 that took in the heat in the heat exchanger 5a flows through the supply pipe 4, and is discharged from the discharge port 4B into the oil 2 in the upper layer of the heat-storage tank 1a. Since the sodium acetate 3 is solid at the starting point of heat storage, the discharge holes 4a provided for the third flow pipe 43 of the supply pipe 4 are in a clogged state by the sodium acetate 3. Therefore, the oil 2 is not discharged from the discharge holes 4a at the starting point of heat storage. So, by keeping the valve 4b open, the oil 2 that took in the heat flows through the supply pipe 4 and is discharged from the discharge port 4B into the oil 2 in the upper layer of the heat-storage tank 1a. Consequently, a danger that the oil 2 flowing through the supply pipe 4 is not discharged and the supply pipe 4 bursts or the like can be eliminated.

When the oil 2 that took in the heat flows through the supply pipe 4, heat conducts to the sodium acetate 3 around the supply pipe 4 due to the indirect contact via the supply pipe 4, the sodium acetate melts to change its state from solid to liquid. Further, when the oil 2 that took in the heat is discharged from the discharge port 4B into the oil 2 in the upper layer, the oil 2 in the upper layer becomes high temperature, the heat of the oil 2 in the upper layer conducts to the sodium acetate 3 on the boundary surface between the oil 2 and the sodium acetate 3, and the state changes from solid to liquid near the boundary surface as well. With this, the oil 2 is also discharged from the discharge holes 4a as the solid sodium acetate 3, which clogs the discharge holes 4a, melts.

Then, when the oil 2a is discharged from the discharge holes 4a into the sodium acetate 3, the oil goes up and is taken into the oil 2 in the upper layer because the specific gravity of the oil 2a is smaller than that of the sodium acetate 3. The oil 2a conducts heat to the sodium acetate 3 due to the direct contact with the sodium acetate 3 as it goes up. Then, the oil 2 in the upper layer is taken from the discharge pipe 6 into the heat exchanger 5a again. By repeating the above-described action, the heat generated from the factory 60 can be stored in the sodium acetate 3 via the oil 2.

Meanwhile, the valve 4b may be closed to shut off the flow path to prevent the oil 2 from flowing through the fourth flow pipe 44 and the fifth flow pipe 45 when the sodium acetate 3 melted into a state where the oil 2 flowing through the supply pipe 4 can be discharged. In this case, the oil 2 flowing through the supply pipe 4 is discharged only from the discharge holes 4a and heat is stored by the direct contact between the oil 2 and the sodium acetate 3, so that heat can be stored more efficiently and in a shorter time.

(In Heat Radiation)

The heat-storage unit 1 in which heat was stored in the factory 60 is transported to the facility 70. Then, in the facility 70, the supply pipe 4 and the discharge pipe 6 of the heat-storage unit 1 are connected to the heat exchanger 5b. At this point, the valve 4b of the heat-storage unit 1 is closed to shut off the flow path to prevent the oil 2 from flowing through the fourth flow pipe 44 and the fifth flow pipe 45. Then, the gas (or liquid) used in the facility 70 is taken into the heat exchanger 5b while the oil 2, which took in the heat to be stored in the sodium acetate 3, is taken into the heat exchanger 5b from the heat-storage tank 1a via the discharge pipe 6. In the heat exchanger 5b, the heat of the oil 2 conducts to the gas used in the facility 70 due to the indirect contact of the pipe. Then, the oil 2 from which heat was taken away is returned to the heat-storage tank 1a via the supply pipe 4.

Because the valve 4b is closed, the oil 2 from which heat was taken away flows through the supply pipe 4 and is forcibly discharged from the discharge holes 4a into the sodium acetate 3. Then, heat to be stored in the sodium acetate 3 conducts to the oil 2 due to the direct contact between the oil 2 and the sodium acetate 3. The oil 2 that took in the heat goes up and is taken into the oil 2 in the upper layer. Then, the oil 2 in the upper layer becomes high temperature, the oil 2 is taken into the heat exchanger 5b from the discharge pipe 6, and the heat of the oil 2 is taken out in the heat exchanger 5b.

Herein, comparison is made with the case where the valve 4b was opened in radiating heat. When the flow path of the fourth flow pipe 44 and the fifth flow pipe 45 is open, much of the oil 2 flowing through the third flow pipe 43 flows through the fourth flow pipe 44 and the fifth flow pipe 45 having a smaller flow path resistance and is discharged from the discharge port 4B even in the case where the sodium acetate 3 is liquid and the oil 2 can be discharged from the discharge holes 4a. Then, as heat radiation continues and the sodium acetate 3 is solidified, the oil 2 flowing through the third flow pipe 43 further flows through the fourth flow pipe 44 and the fifth flow pipe 45. As a result, the heat stored in the sodium acetate 3 conducts to the oil 2 due to the indirect contact via the supply pipe 4, the efficiency of heat conduction becomes worse comparing to the case where heat conducts due to the direct contact with the sodium acetate 3, and the stored heat cannot be taken out sufficiently.

Therefore, by closing the valve 4b to shut off the flow path of the fourth flow pipe 44 and the fifth flow pipe 45, the oil 2 is discharged from the discharge holes 4a, and the stored heat can be taken out efficiently and sufficiently due to the direct contact with the sodium acetate 3.

Note that the constitution of the supply pipe 4 is not limited to the constitution explained in this embodiment. For example, the third flow pipe 43 of the supply pipe 4 may be large enough to cover the entire bottom surface of the heat-storage tank 1a, or may be constituted that the pipe is bent in plural steps so as to cover the entire bottom surface of the heat-storage tank 1a. Meanwhile, it is preferable that the third flow pipe 43 be arranged in the lower portion of the sodium acetate 3. In this case, the oil 2 discharged from the discharge holes 4a directly contacts the oil 2 for a long time by being discharged in the lower portion of the sodium acetate 3, so that heat exchange can be sufficiently performed with the sodium acetate 3.

Furthermore, the valve 4b provided for the fourth flow pipe 44 may be a solenoid valve or an electric-operated valve. In addition, the flow amount of the oil 2 flowing through the fourth flow pipe 44 may be adjusted corresponding to the state of the sodium acetate 3 or heat quantity required by the heat exchanger 5b. For example, when high-temperature heat is not required in the heat exchanger 5b, oil may be discharged from the discharge holes 4a by opening the valve 4b and the heat quantity to be taken out from the sodium acetate 3 may be adjusted by adjusting the amount of oil 2 that is allowed to directly contact the sodium acetate 3.

As described above, this embodiment is the heat-storage unit 1 capable of exchanging heat by direct contact between the oil 2 and the sodium acetate 3, storing heat in the sodium acetate 3, and radiating heat from the sodium acetate 3 by supplying the oil 2, which has a smaller specific gravity than the sodium acetate 3 and is separated from the sodium acetate 3, into a heat-storage tank 1a housing the sodium acetate 3, which stores heat depending on a state change between solid and liquid, in an internal space, in which the unit includes: the third flow pipe 43 of the supply pipe 4, at least a part of which is provided in the lower portion of the internal space and in which the oil 2 flows; a plurality of discharge holes 4a which is provided for the third flow pipe 43 and discharges the oil 2 flowing through the third flow pipe 43 into the sodium acetate 3; the fourth flow pipe 44 of the supply pipe 4, which is connected to the third flow pipe 43 and discharges the oil 2 flowing through the third flow pipe 43 outside the sodium acetate 3; and a valve 4b that shuts off the fourth flow pipe 44 corresponding to the state change of the sodium acetate 3.

According to this constitution, the fourth flow pipe 44 of the supply pipe 4 is shut off corresponding to the state change of the sodium acetate 3, so that it is possible to appropriately change whether the oil 2 flowing through the third flow pipe 43 should be forcibly discharged from the discharge holes 4a into the sodium acetate 3 housed in the heat-storage tank 1a or should be discharged from the second flow pipe into the oil 2 housed in the heat-storage tank 1a. Thus, heat can be efficiently stored in the sodium acetate 3 and heat can be efficiently radiated from the sodium acetate 3.

Specifically, when the discharge holes 4a are clogged by the sodium acetate 3, the oil 2 in the third flow pipe 43 flows through the fourth flow pipe 44 and is discharged outside the sodium acetate 3. Therefore, the oil 2 is discharged from the fourth flow pipe 44 to the outside of the sodium acetate 3 without directly contacting the sodium acetate 3, and heat exchange between the oil 2 and the sodium acetate 3 is not performed sufficiently. Then, by shutting off the fourth flow pipe 44 corresponding to the state of the sodium acetate 3, the oil 2 in the third flow pipe 43 is discharged from the discharge holes 4a into the sodium acetate 3, and sufficient heat exchange is performed by the direct contact with the sodium acetate 3. Therefore, it is possible to efficiently radiate heat or store heat from/in the sodium acetate 3.

Further, this embodiment is the operation method of the heat-storage unit 1, in which the oil 2 is allowed to flow through the fourth flow pipe 44 and the fifth flow pipe 45 when storing heat in the sodium acetate 3, and the valve 4b is operated to shut off the oil 2 flowing through the fourth flow pipe 44 when radiating heat from the sodium acetate 3.

According to this constitution, a flow destination of the oil 2 when storing heat and radiating heat is changed, so that the problem that the oil 2 does not flow depending on the state of the sodium acetate 3 can be solved. This makes it possible to sufficiently flow the oil 2, and heat storage or heat radiation in/from the sodium acetate 3 can be performed efficiently.

Specifically, the sodium acetate 3 at the starting point of heat storage is solid, and the discharge holes 4a are clogged by the sodium acetate 3. Therefore, by allowing the oil 2 to flow through the fourth flow pipe 44, the oil 2 in the third flow pipe 43 is discharged outside the sodium acetate 3. This eliminates the danger that the oil 2 in the third flow pipe 43 has nowhere to go and the third flow pipe 43 bursts, or the like. Then, by allowing the oil 2 to flow, the heat of the oil can be conducted to the sodium acetate 3 by the indirect contact via the flow pipe, and when the sodium acetate 3 melts by the heat conduction, the oil 2 is discharged from the discharge holes 4a into the sodium acetate 3 and it becomes possible to allow the oil 2 and the sodium acetate 3 to contact directly. Thus, heat can be efficiently stored.

Furthermore, when radiating heat from the sodium acetate 3, sufficient heat exchange is performed by directly contacting the oil 2 and the sodium acetate 3, and stored heat can be taken out. However, the state of the sodium acetate 3 changes to solid as heat radiation continues. Eventually, the discharge holes 4a are clogged by the sodium acetate 3, and the oil 2 in the third flow pipe 43 is discharged outside the sodium acetate 3. Therefore, by shutting off the oil 2 flowing through the fourth flow pipe 44, the oil 2 in the third flow pipe 43 is forcibly discharged from the discharge holes 4a into the sodium acetate 3, and this allows the oil 2 to directly contact the sodium acetate 3. Accordingly, heat stored in the sodium acetate 3 can be sufficiently taken out.

Modified Example of the First Embodiment

Figure 3:
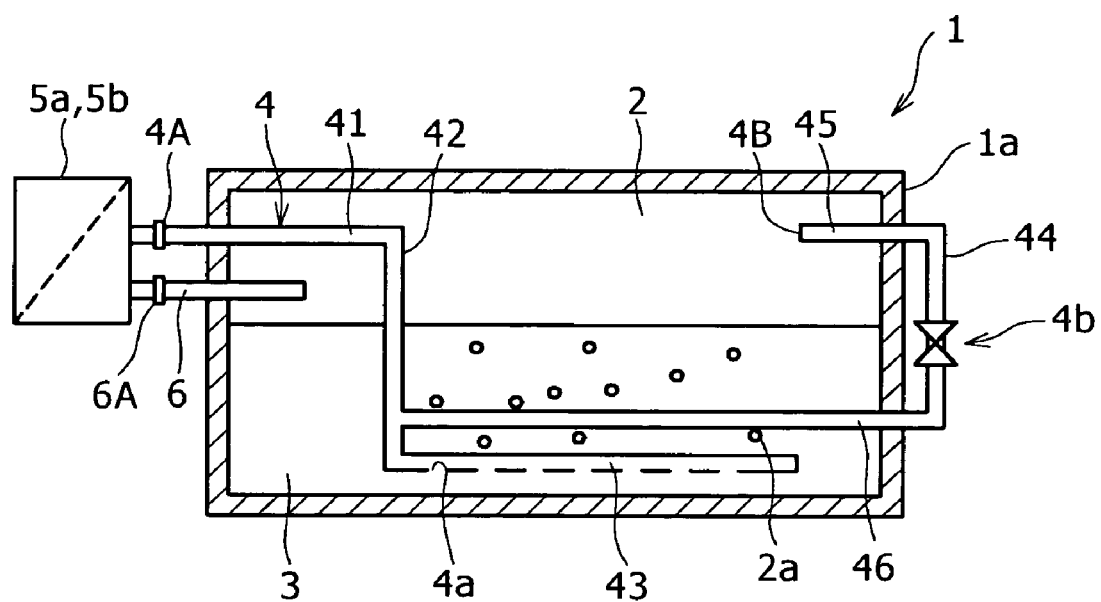
FIG. 3 is a sectional view showing a modified example of the heat-storage unit according to the first embodiment of the present invention.

The heat-storage unit 1 shown in FIG. 3 may be used as a modified, example of this embodiment. Specifically, the supply pipe 4 has a constitution that the flow pipe 41, the second flow pipe 42, the third flow pipe 43, the fourth flow pipe 44, the fifth flow pipe 45, and the sixth pipe 46 are connected. The flow pipes 41 to 43 connected as described above. Then the sixth flow pipe 46 is disposed vertically to the second flow pipe 42 so as to face the upper portion of the third flow pipe 43. The sixth flow pipe 46 is vertically provided for the sidewall of the heat-storage tank 1a so as to allow the sodium acetate 3 pass horizontally and to protrude outside the heat-storage tank 1a. Then, outside the heat-storage tank 1a, the fourth flow pipe 44 is vertically disposed on one end of the sixth flow pipe 46.

Then, in storing heat, the oil 2 that took in the heat in the heat exchanger 5a flows through the flow pipe 41, the second flow pipe 42, the sixth flow pipe 46, the fourth flow pipe 44 and the fifth flow pipe 45 and is discharged from the discharge port 4B by opening the valve 4b. Further, in radiating heat, the oil 2 flows through the flow pipe 41, the second flow pipe 42 and the third flow pipe 43 and is discharged from the discharge holes 4a into the sodium acetate 3 by closing the valve 4b. Thus, heat can be efficiently stored and radiated by opening/closing the valve 4b corresponding to the state of the sodium acetate 3 as described above.

Figure 4:
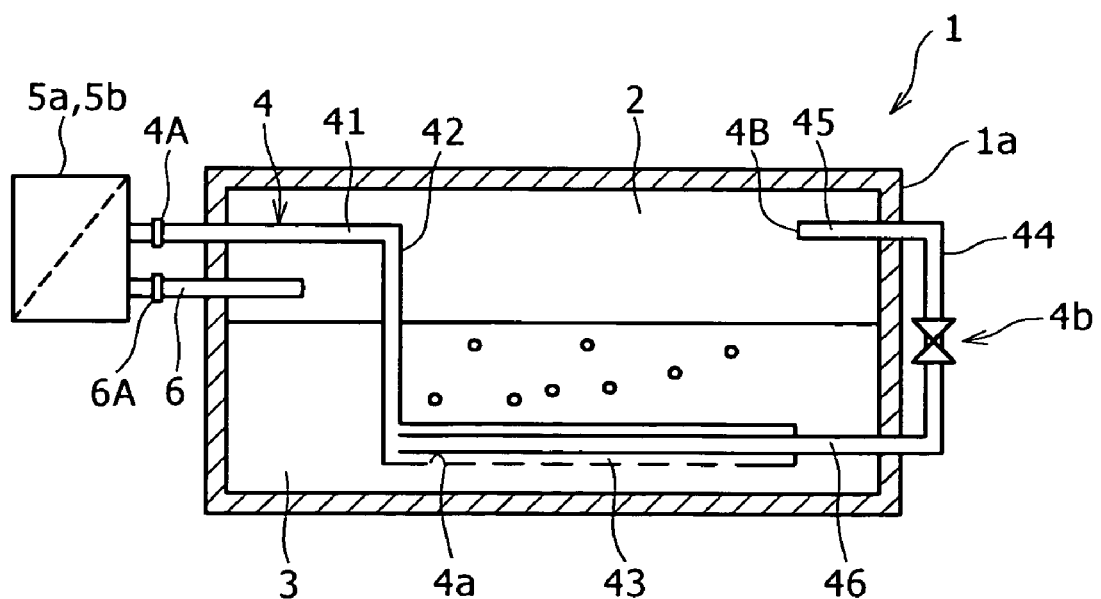
FIG. 4 is a sectional view showing a modified example of the heat-storage unit according to the first embodiment of the present invention.

Furthermore, as another modified example, the unit may be constituted that the third flow pipe 43 surrounds the sixth flow pipe 46 as shown in FIG. 4. In this case, when the valve 4b is opened to allow the oil 2 to flow through the flow pipe 41, the second flow pipe 42, the sixth flow pipe 46, the fourth flow pipe 44 and the fifth flow pipe 45, the oil 2 in the third flow pipe 43 can be maintained at high temperature due to the indirect contact via the sixth flow pipe 46. Thus, the heat of the oil 2 conducts to the sodium acetate 3 around the third flow pipe 43 due to the indirect contact via the third flow pipe 43, the sodium acetate 3 melts, and the oil 2 in the third flow pipe 43 is discharged from the discharge holes 4a. Then, since the oil 2 to be discharged from the discharge holes 4a of the third flow pipe 43 is high temperature, heat can be efficiently stored in the sodium acetate 3 by directly contacting the oil 2.

Second Embodiment

Next, description will be made for the heat-storage unit according to the second embodiment of the present invention. A heat-storage unit 10 according to this embodiment is different from the first embodiment on the constitution of the supply pipe that supplies the oil 2 from the heat exchangers 5a, 5b to the heat-storage tank 1a and on the point where the internal space of the heat-storage tank 1a is vertically separated. In the following, the different points will be described. Note that the same reference numerals are applied for the same members as the first embodiment, and their explanation will be omitted.

Figure 5:
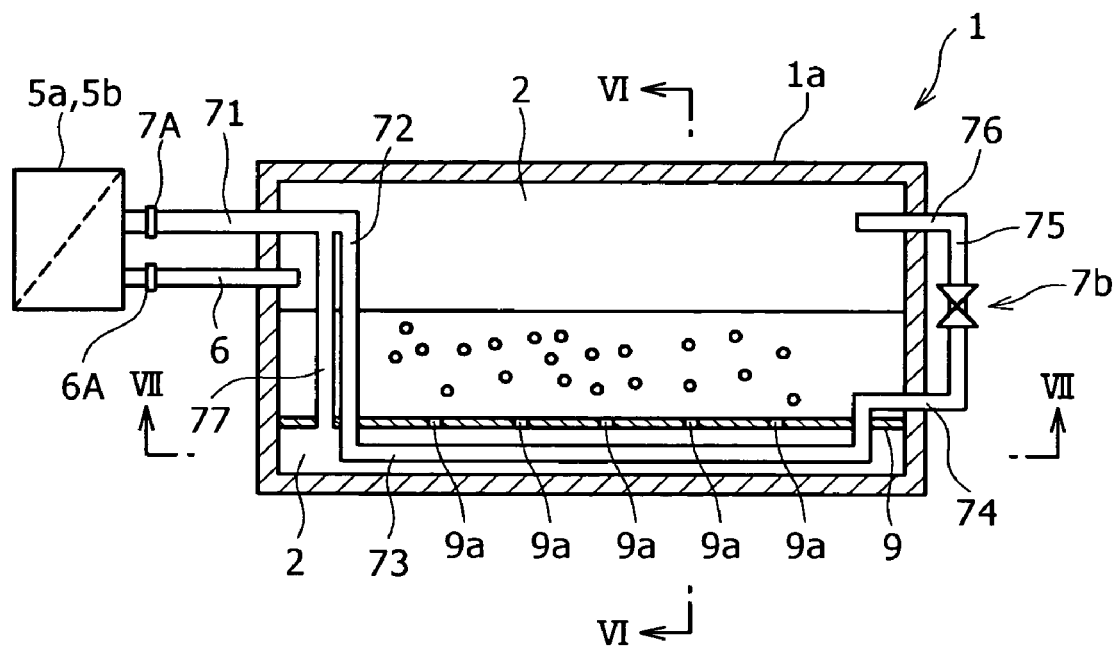
FIG. 5 is a sectional view of a heat-storage unit according to a second embodiment of the present invention.

As shown in FIG. 5, in the heat-storage unit 10 of this embodiment, the internal space of the heat-storage tank 1a is vertically separated into two spaces by a separating plate 9. The separating plate 9 is a flat plate and a plurality of holes 9a, through which the oil 2 can pass is provided, is provided for the plate. Note that the separating plate 9 is formed of a member having high heat conductivity. The oil 2 and the sodium acetate 3 are housed in the upper side (hereinafter, referred to as "upper space") of the internal space that were vertically separated by the separating plate 9, and only the oil 2 is housed in the lower side (hereinafter, referred to as "lower space") of the separated internal space. Note that it is preferable that the separating plate 9 be provided in the lower portion of the heat-storage tank 1a. Further, the oil 2 and the sodium acetate 3 in the upper space are housed respectively in the upper layer and the lower layer in a separated manner as described in the first embodiment.

A supply pipe 7 has a constitution that a first flow pipe 71, a second flow pipe 72, a third flow pipe 73, a fourth flow pipe 74, a fifth flow pipe 75, the sixth pipe 76 and a seventh flow pipe 77, through which the oil 2a can flow, are connected. The first flow pipe 71 is provided in a position where it is protruded into the oil 2 in the upper layer, which is housed in the heat storage tank 1a. Then, a connection port 7A for detachably connecting to the heat exchangers 5a, 5b is provided for one end of the first flow pipe 71, and the upper end of the second flow pipe 72 is disposed on the other end so as to be orthogonally provided in a standing manner. The second flow pipe 72 is designed to vertically cross the boundary surface between the oil 2 and the sodium acetate 3 which are housed in the heat-storage tank 1a, and furthermore, the lower end of the second flow pipe 72 is designed to go into the oil 2 in the lower space.

Figure 6:
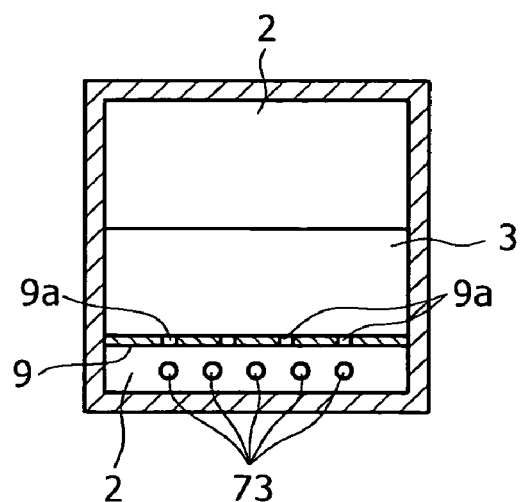
FIG. 6 is a sectional view taken along VI-VI line of FIG. 5.
Figure 7:
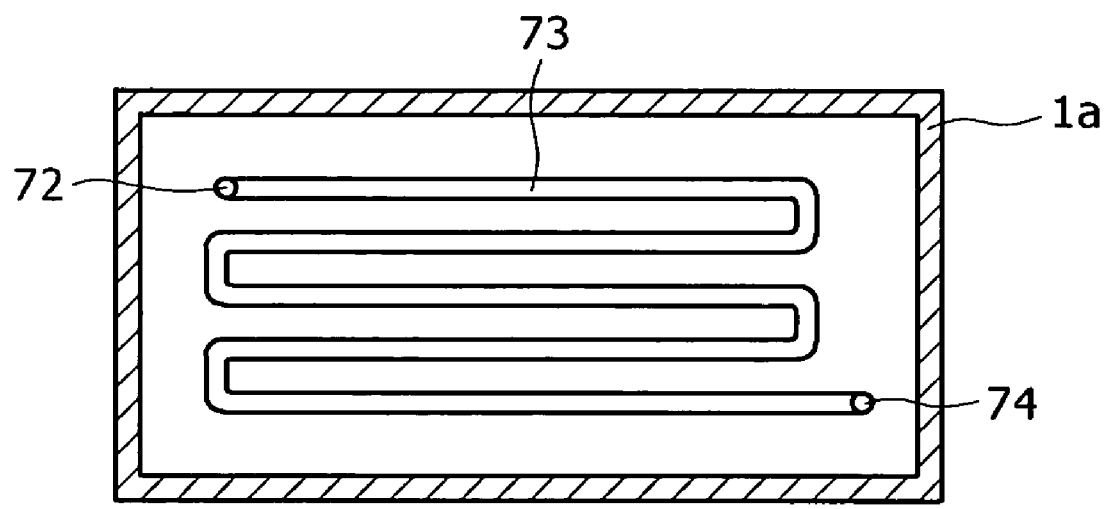
FIG. 7 is a sectional view taken along VII-VII line of FIG. 5.

One end of the third flow pipe 73 is disposed on the lower end of the second-flow pipe 72. The third flow pipe 73 covers the bottom surface of the heat-storage tank 1a and is bent in plural steps such that adjacent flow pipes become parallel with each other, as shown in FIG. 6 and FIG. 7. Then, the fourth flow pipe 74 is disposed on the other end of the third flow pipe 73. The fourth flow pipe 74 has an L-shape, enters the upper space passing through the separating plate 9 from the lower space, is further bent vertically, and is vertically provided for the sidewall of the heat-storage tank 1a in a penetrated manner so as to be protruded outside the heat-storage tank 1a.

Then, outside the heat-storage tank 1a, the lower end of the fifth flow pipe 75 is vertically disposed on one end of the fourth flow pipe 74. Furthermore, one end of the sixth flow pipe 76, which is provided for the sidewall of the heat-storage tank 1a in a penetrated manner so as to be protruded into the oil 2 housed in the heat-storage tank 1a, is disposed on the upper end of the fifth flow pipe 75. A discharge port 7B that discharges the oil 2 flowing inside the pipe is provided for the other end of the sixth flow pipe 76. In addition, a valve 7b is provided for the fifth flow pipe 75. The valve 7b is the same as the valve 4b in the first embodiment.

Still further, the seventh flow pipe 77 is disposed on the first flow pipe 71 in parallel with the second flow pipe 72. The seventh flow pipe 77 is provided for the separating plate 9 in a penetrated manner such that the oil 2 flowing through the first flow pipe 71 can be supplied into the lower space.

By constituting the supply pipe 7 as described above, the oil 2 from the heat exchangers 5a, 5b flows through the flow pipes 71 to 76, is disposed from the dispose port 7B, further flows through the flow pipes 71, 77, and is discharged into the lower space. The oil 2 disposed into the lower-space is disposed from the dispose holes 9a into the sodium acetate 3 in the upper space.

Note that the explanation of the heat exchangers 5a, 5b, the discharge pipe 6 and the like is omitted because they are the same as the first embodiment.

Next, description will be made for the operation method of the heat-storage unit 1 and the action of the oil 2 when performing heat storage and heat radiation to the heat-storage unit 1.

(In Heat Storage)

In the factory 60, the supply pipe 7 and the discharge pipe 6 of the heat-storage unit 10 are connected to the heat exchanger 5a. At this point, the valve 7b of the heat-storage unit 10 is opened to open the flow path to allow the oil 2 to flow through the fifth flow pipe 75 and the sixth flow pipe 76. Then, the steam generated from the factory 60 is taken into the heat exchanger 5a while the oil 2 in the heat-storage tank 1a is taken into the heat exchanger 5a via the discharge pipe 6. In the heat exchanger 5a, the heat of the steam conducts to the oil 2 due to the indirect contact via the pipe. Then, the oil 2 that took in the heat is returned to the heat-storage tank 1a via the supply pipe 7.

The oil 2 that took in the heat in the heat exchanger 5a flows through the flow pipes 71 to 76 of the supply pipe 7 on one hand, and is discharged from the discharge port 7B into the oil 2 in the upper space of the heat-storage tank 1a, and on the other hand, flows through the flow pipes 71, 77 of the flow pipe 7 and is discharged into the oil 2 in the lower space. Since the sodium acetate 3 is solid at the starting point of heat storage, the discharge holes 9a provided for the separating plate 9 are in a clogged state by the sodium acetate 3. Therefore, the oil 2 that was discharged into the lower space is not discharged from the discharge holes 9a but the oil 2 is filled in the lower space at the starting point of heat storage, so that the oil 2 in the first flow pipe 71 does not flow through the seventh flow pipe 77. Therefore, by keeping the valve 7b open, the oil 2 that took in the heat flows through the flow pipes 71 to 76 of the supply pipe 4 and is discharged from the discharge port 7B into the oil 2 in the upper layer of the upper space.

When the oil 2 that took in the heat flows through the flow pipes 71 to 76 of the supply pipe 7, heat conducts to the oil 2, which is housed in the lower space, via the third flow pipe 73 through which the high-temperature oil 2 flows, and the temperature is maintained at a high level. Then, the oil 2 in the lower space conducts to the sodium acetate 3 via the separating plate 9. Further, when the oil 2 that took in the heat in the heat exchanger 5b is discharged into the oil 2 in the upper layer of the upper space from the discharge port 7B, the oil 2 in the upper layer becomes high temperature, the heat of the oil 2 in the upper layer conducts to the sodium acetate 3 on the boundary surface between the oil 2 and the sodium acetate 3, and the state changes from solid to liquid near the boundary surface as well. Consequently, the sodium acetate 3 melts and the high-temperature oil 2 can be discharged from the discharge holes 9a of the separating plate 9. Then, heat is conducted to the sodium acetate 3 due to the direct contact with the discharged oil 2.

(In Heat Radiation)

The heat-storage unit 10 in which heat was stored in the factory 60 is transported to the facility 70. Then, in the facility, the supply pipe 7 and the discharge pipe 6 of the heat-storage unit 10 are connected to the heat exchanger 5b. At this point, the valve 7b of the heat-storage unit 10 is closed to shut off the flow path to prevent the oil 2 from flowing through the fifth flow pipe 75 and the sixth flow pipe 76. Then, the gas (or liquid) used in the facility 70 is taken into the heat exchanger 5b while the oil 2, which took in the heat to be stored in the sodium acetate 3, is taken into the heat exchanger 5b from the heat-storage tank 1a via the discharge pipe 6. In the heat exchanger 5b, the heat of the oil 2 conducts to the gas used in the facility 70 due to the indirect contact of the pipe. Then, the oil 2 from which heat was taken away is returned to the heat-storage tank 1a via the supply pipe 7.

Because the valve 7b is closed, the oil 2 from which heat was taken away flows from the first flow pipe 71 to the seventh flow pipe 77, is discharged into the lower space, and discharged only from the discharge holes 9a of the separating plate 9. Then, heat to be stored in the sodium acetate 3 conducts to the oil 2 due to the direct contact between the oil 2 and the sodium acetate 3. The oil 2 that took in the heat goes up and is taken into the oil 2 in the upper layer. Then, the oil 2 in the upper layer becomes high temperature, the oil 2 is taken into the heat exchanger 5b from the discharge pipe 6, and the heat of the oil 2 is taken out in the heat exchanger 5b.

(Effects in Heat Radiation)

Figure 8A:
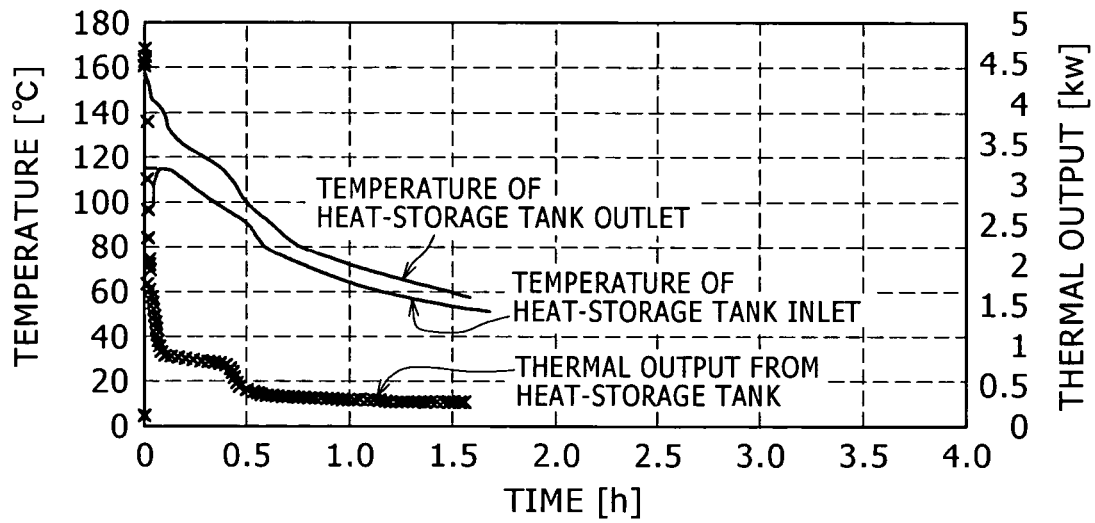
FIG. 8($a$) is the result of heat radiation simulation conducted while a valve was opened, and FIG. 8($b$) is the result of heat radiation simulation conducted while the valve was closed.
Figure 8B:
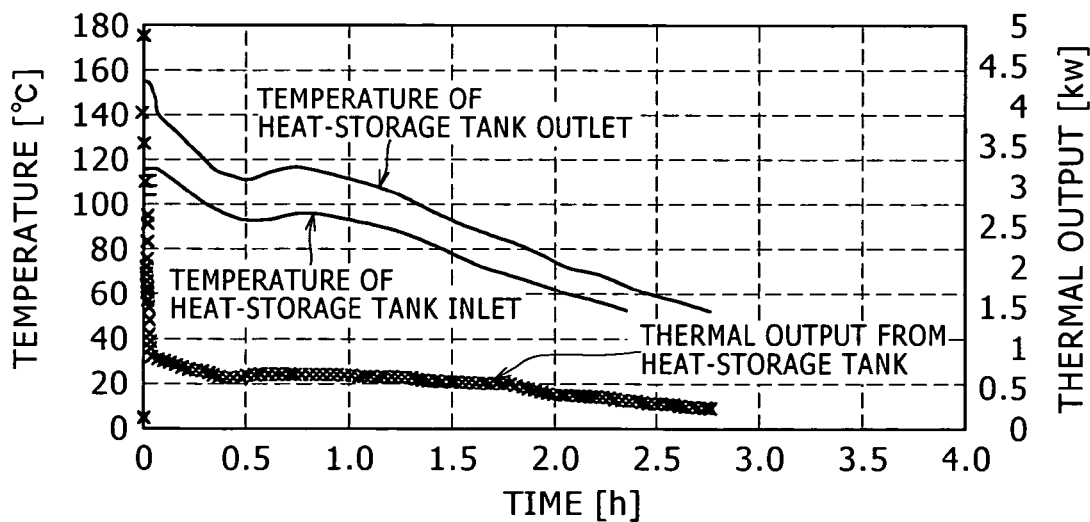

Next, simulations regarding thermal efficiency when the valve 7b was opened and closed in radiating heat were conducted by using the heat-storage unit 10 of this embodiment. FIGS. 8(a) and (b) are graphs showing the temperature of the oil 2 in the first flow pipe 71 of the supply pipe 7 (inlet temperature), the temperature of oil 2 in the discharge pipe 6 (outlet temperature) and thermal output together with the passage of time from the start of heat radiation. FIG. 8(a) is the result of simulation performed while a valve was opened, and FIG. 8(b) is the result of simulation performed while the valve was closed. Note that the thermal output is a value showing heat quantity that was taken out per unit time.

As it is read from FIG. 8, the inlet temperature is about 50° C., the outlet temperature is about 60° C. and the thermal output is about 0.25 [kW] when the valve 7b is opened after 1.5 [h] passed from the start of heat radiation. On the other hand, the inlet temperature is about 80° C., the outlet temperature is about 95° C. and the thermal output is about 0.5 [kW] when the valve 7b is closed. Specifically, the thermal output is larger when the valve 7b is closed than the case where the valve is opened despite that the same time passed. In other words, when the same time passed, a larger heat quantity can be taken out when the valve 7b is closed. Further, the thermal output is 2.5 [kW] after about 2.5 [h] passed when the valve is closed, and it means that the stored heat can be taken out sufficiently for a longer time than the case where the valve 7b is opened.

As described above, this embodiment is the heat-storage unit 10 capable of exchanging heat by direct contact between the oil and the sodium acetate 3, storing heat in the sodium acetate 3, and radiating heat from the sodium acetate 3 by supplying the oil 2, which has a smaller specific gravity than the sodium acetate 3 and is separated from the sodium acetate 3, into a heat-storage tank 1a housing the sodium acetate 3, which stores heat depending on a state change between solid and liquid, in an internal space, in which the unit includes: the separating plate 9 that vertically separates the internal space so as to be capable of housing the sodium acetate 3 in the upper side and the oil on the lower side and which has the discharge holes 9a through which the oil 2 can pass; the first flow pipe 71 and the seventh flow pipe 77 of the supply pipe 7, which supply the oil 2 to the lower side of the separating plate 9; the flow pipes 73 to 76 that are connected to the first flow pipe 71 and the seventh flow pipe 77, arranged so as to pass at least through the sodium acetate 3, and discharge the oil 2 flowing through the inside the pipes outside the sodium acetate 3; and the valve 7b that shuts off the flow pipes 73 to 76 corresponding to the state change of the sodium acetate 3.

According to this constitution, the flow pipes 73 to 76 are shut off corresponding to the state change of the sodium acetate 3, so that it is possible to appropriately change whether the oil 2 flowing through the first flow pipe should be forcibly discharged from the discharge holes 9a into the sodium acetate 3 housed in the heat-storage tank 1a or should be discharged from the flow pipes 73 to 76 into the oil 2 housed in the heat-storage tank 1a. Thus, heat can be efficiently stored in the sodium acetate 3 and heat can be efficiently radiated from the sodium acetate 3.

Further, the flow pipes 73 to 76 of this embodiment are arranged so as to further pass under the separating plate.

According to this constitution, by allowing the flow pipes 73 to 76 to pass under the separating plate, heat exchange is indirectly performed between the oil 2 flowing through the flow pipes 73 to 76 and the oil 2 housed in the lower side of the separating plate. Therefore, in the case where the oil 2 flowing through the flow pipes 73 to 76 carries heat, the oil 2 under the separating plate can be maintained at high temperature. Then, by allowing the oil 2 under the high-temperature separating plate 9 to be discharged from the discharge holes 9a into the sodium acetate 3, heat can be efficiently stored in the sodium acetate 3.

Furthermore, this embodiment is the operation method of the heat-storage unit 10, in which the oil 2 is allowed to flow through the flow pipes 73 to 76 when storing heat in the sodium acetate 3, and the valve 7b is operated to shut off the oil 2 flowing through the flow pipes 73 to 76 when radiating heat from the sodium acetate 3.

According to this constitution, since a flow destination of the oil 2 in storing heat and radiating heat is changed, the problem that the oil 2 does not flow depending on the state of the sodium acetate 3 can be solved. This makes it possible to sufficiently flow the oil 2, and heat storage or heat radiation in/from the sodium acetate 3 can be performed efficiently.

The present invention is described in the above-described preferred embodiments, but the present invention is not limited only to them. It should be understood that other various embodiments can be implemented without departing from the spirit and scope of the present invention. Furthermore, operations and effects by the constitution of the present invention are described in the embodiments, but these operations and effects are only examples and do not limit the present invention.

What is claimed is:

1. A heat-storage unit comprising:
   a heat-storage tank;
   a separating plate that separates an internal space of the heat-storage tank into an upper space and a lower space so as to house a heat-storage material for storing heat by a state change from solid to liquid in the upper space and a heat exchange medium in the lower space and has passage holes through which said heat exchange medium can pass;
   a first flow pipe that supplies said heat exchange medium to the lower space;
   a second flow pipe that is connected to said first flow pipe and the separation plate, has a portion passing through at least said heat-storage material, and discharges said heat exchange medium, which flows through the inside of the second flow pipe, from a discharge port to the outside of said heat-storage material; and
   a shutoff section that shuts off said second flow pipe corresponding to the state change of said heat-storage material, the shutoff section being disposed between the discharge port and the portion passing through at least said heat-storage material, wherein heat is exchanged by direct contact between the heat exchange medium and the heat-storage material, and the heat-exchange medium has a smaller specific gravity than the heat-storage material.

2. The heat-storage unit according to claim 1, wherein said second flow pipe is arranged so as to further pass under said separating plate.

3. An operation method of the heat-storage unit according to claim 1, wherein said heat exchange medium is allowed to flow through said second flow pipe when storing heat in said heat-storage material, and
   said shutoff section is operated to shut off said heat exchange medium flowing through said second flow pipe when radiating heat from said heat-storage material.

4. An operation method of the heat-storage unit according to claim 2, wherein said heat exchange medium is allowed to flow through said second flow pipe when storing heat in said heat-storage material, and
   said shutoff section is operated to shut off said heat exchange medium flowing through said second flow pipe when radiating heat from said heat-storage material.

* * * * *

UNITED STATES PATENT AND TRADEMARK OFFICE
CERTIFICATE OF CORRECTION

| | |
|---|---|
| PATENT NO. | : 7,654,306 B2 |
| APPLICATION NO. | : 11/489571 |
| DATED | : February 2, 2010 |
| INVENTOR(S) | : Takahashi et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 284 days.

Signed and Sealed this

Twenty-third Day of November, 2010

David J. Kappos
*Director of the United States Patent and Trademark Office*